(12) United States Patent  
Fortes (10) Patent No.: US 7,770,109 B2
(45) Date of Patent: Aug. 3, 2010

(54) ADAPTIVE LAYOUT FOR CONTENT

(75) Inventor: Filipe Fortes, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 1017 days.

(21) Appl. No.: 11/305,631

(22) Filed: Dec. 16, 2005

(65) Prior Publication Data

US 2007/0168859 A1 Jul. 19, 2007

(51) Int. Cl.
*G06F 7/00* (2006.01)
(52) U.S. Cl. .................. 715/246; 715/209; 715/227; 715/243
(58) Field of Classification Search ......... 715/200–277, 715/700–866; 345/418–475, 521, 619; 705/1–45; 709/203
See application file for complete search history.

(56) References Cited

U.S. PATENT DOCUMENTS

| | | | | |
|---|---|---|---|---|
| 5,668,961 A * | 9/1997 | Healy et al. | ................. | 715/744 |
| 5,838,317 A * | 11/1998 | Bolnick et al. | ............... | 715/764 |
| 6,469,719 B1 * | 10/2002 | Kino et al. | .................. | 715/810 |
| 6,803,914 B2 * | 10/2004 | Babcock | ..................... | 345/468 |
| 6,826,727 B1 * | 11/2004 | Mohr et al. | .................. | 715/235 |
| 6,915,482 B2 * | 7/2005 | Jellum et al. | ................ | 715/234 |
| 7,200,808 B1 * | 4/2007 | Nagao | ........................ | 715/210 |
| 7,216,293 B2 * | 5/2007 | Kataoka et al. | ............. | 715/246 |
| 7,222,306 B2 * | 5/2007 | Kaasila et al. | ............... | 715/801 |
| 7,360,166 B1 * | 4/2008 | Krzanowski | ................. | 715/767 |
| 7,395,500 B2 * | 7/2008 | Whittle et al. | ............... | 715/243 |
| 7,424,672 B2 * | 9/2008 | Simske et al. | ............... | 715/243 |
| 7,620,633 B1 * | 11/2009 | Parsons et al. | .................. | 707/7 |
| 2002/0186257 A1 * | 12/2002 | Cadiz et al. | .................. | 345/838 |
| 2004/0070627 A1 * | 4/2004 | Shahine et al. | ............... | 345/794 |
| 2004/0187079 A1 * | 9/2004 | Yamada et al. | ............... | 715/517 |
| 2004/0212640 A1 * | 10/2004 | Mann et al. | .................. | 345/792 |
| 2004/0225961 A1 * | 11/2004 | Ohashi et al. | ............... | 715/517 |
| 2004/0268221 A1 * | 12/2004 | Wang | ........................ | 715/500.1 |
| 2005/0076297 A1 * | 4/2005 | Tanaka et al. | ................ | 715/526 |
| 2005/0120288 A1 * | 6/2005 | Boehme et al. | ............. | 715/500 |
| 2005/0193334 A1 * | 9/2005 | Ohashi et al. | ................ | 715/517 |
| 2005/0283734 A1 * | 12/2005 | Santoro et al. | ............... | 715/765 |
| 2007/0083496 A1 * | 4/2007 | Martinez | ........................ | 707/3 |
| 2008/0168372 A1 * | 7/2008 | Inui et al. | .................... | 715/766 |

* cited by examiner

*Primary Examiner*—Doug Hutton
*Assistant Examiner*—Zaida I Marrero
(74) *Attorney, Agent, or Firm*—Workman Nydegger (57) ABSTRACT

Aspects of the subject matter described herein relate to arranging content in single and multi-column formats to be displayed using a graphical user interface (GUI). Aspects also relate to utilizing user feedback to determine available screen area for displaying multiple items of the content and arranging and formatting the content for display using heuristics (e.g., rules or logic) that provide guidelines for arranging the content in a readable format while utilizing the available area indicated by the user.

15 Claims, 6 Drawing Sheets

SINGLE COLUMN LAYOUT

Two Column Layout

FIG. 6

Three Column Layout

FIG. 7

Four Column Layout

ADAPTIVE LAYOUT FOR CONTENT

BACKGROUND

With all the information available on the Internet and through on-line news sources, displaying content on a graphical user interface is becoming increasingly important to ensure availability of the content as well as provide efficient use of available screen real-estate. Conventional methods for displaying content typically do not make efficient use of available screen real-estate and/or do not produce an aesthetically pleasing product. Traditional methods used for formatting print on a newspaper or otherwise also do not adapt well to electronic delivery and display mechanisms.

SUMMARY

Briefly, aspects of the subject matter described herein relate to arranging content in single and multi-column formats to be displayed using a graphical user interface (GUI). Aspects also relate to utilizing user feedback to determine available screen area for displaying multiple items of the content and arranging and formatting the content for display using heuristics (e.g., rules or logic) that provide guidelines for arranging the content in a readable format while utilizing the available area indicated by the user.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" should be read as "one or more aspects". Identifying aspects of the subject matter described in the Detailed Description is not intended to identify key or essential features of the claimed subject matter.

The aspects described above and other aspects will become apparent from the following Detailed Description when taken in conjunction with the drawings, in which:

DETAILED DESCRIPTION

Exemplary Operating Environment

Figure 1:
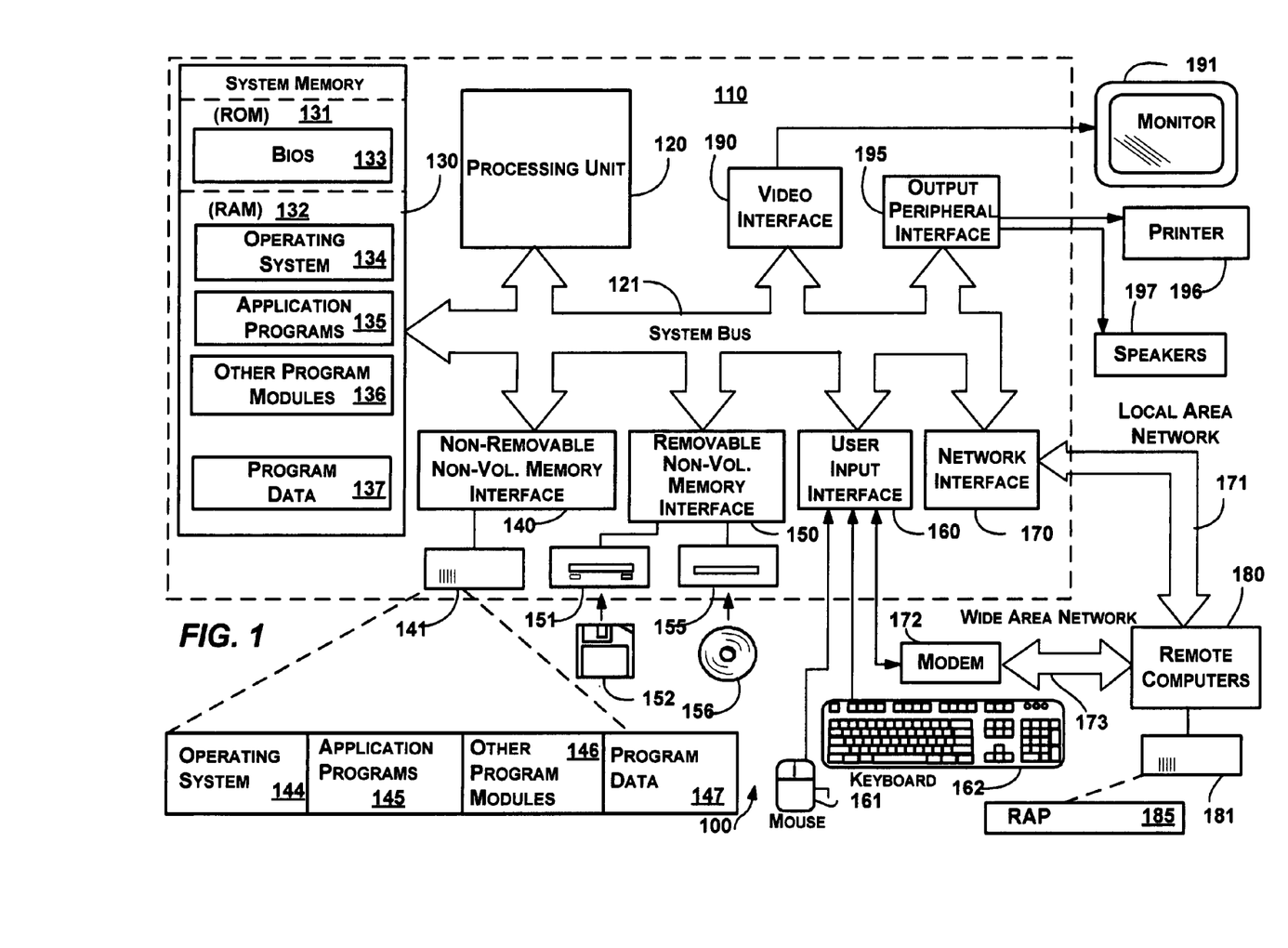
FIG. 1 is a block diagram representing a computer system into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, distributed computing environments that include any of the above systems or devices, and the like.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared (IR), and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

Computer 110 may operate in a networked environment using logical connections to one or more remote computers, such as a remote computer 180. Remote computer 180 may be a personal computer, a server, a router, a network PC, a peer device or other common network node, and typically includes many or all of the elements described above relative to computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, computer 110 is connected to LAN 171 through a network interface or adapter 170. When used in a WAN networking environment, computer 110 typically includes a modem 172 or other means for establishing communications over WAN 173, such as the Internet. Modem 172, which may be internal or external, may be connected to the system bus 121 via user input interface 160 or other appropriate mechanism. In a networked environment, program modules depicted relative to computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Adaptive Layout for Content

A graphical user interface (or more simply, GUI) may be viewed as any interface for enabling a user to visually access and interact with content. Examples of devices utilizing GUIs that may incorporate the subject matter described herein include, but are not limited to, devices described in conjunction with FIG. 1. Aspects of the subject matter described herein relate to providing an adaptive content layout methodology for single and multi-column content to be displayed using a GUI. The subject matter described herein utilizes user feedback to determine available screen area for displaying of the multiple items of content, and arranges and formats the content for display using heuristics (e.g., rules or logic) that provide guidelines for arranging the content in a readable format while utilizing the user determined available area. The heuristics may be used to determine which portions of the content (e.g., for a news story: photo, title, byline, abstract, body; for an advertisement: photo, company name, trademark, body of advertisement, etc.) are displayed. Content layout may be periodically updated for situations involving dynamic content.

Figure 2:
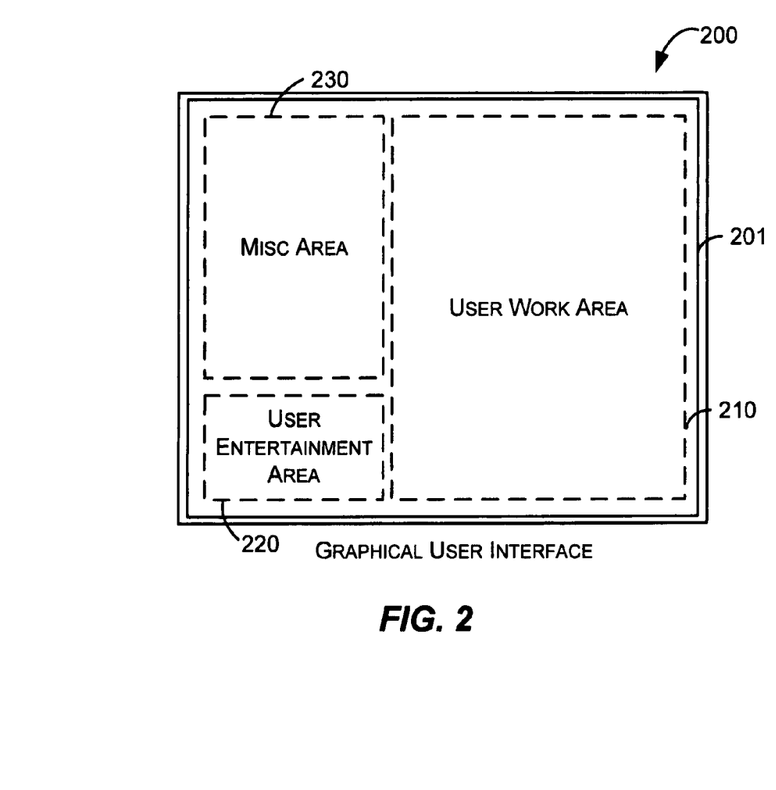
FIG. 2 is a block diagram of available screen real-estate of a graphical user interface wherein a portion of the available screen real-estate is used for an adaptive column layout in accordance with aspects of the subject matter described herein.

FIG. 2 is a block diagram of available screen real-estate of a graphical user interface wherein a portion of the available screen real-estate is used for an adaptive column layout in accordance with aspects of the subject matter described herein. GUI 200 is a program interface that takes advantage of a computer's graphics capabilities to make a program easier for a user to use. GUI 200 displays certain icons, buttons, dialogue boxes, and the like in windows on the screen and a user interacts with GUI 200 by moving a pointer on the screen (typically controlled by a mouse) and selecting certain objects, such as, by pressing buttons on the mouse while the pointer is pointing at them.

GUI 200, as shown, includes main user area 201, which is a graphical sub-portion of the available area of GUI 200 where the user typically interacts with applications that are running on GUI 200. Main user area 201, as shown, includes three user areas, user work area 210, user entertainment area 220, and miscellaneous area 230. Each of the user areas is a user defined graphical sub-portion window of main user area 201. It will be recognized that the areas shown in GUI 200 are exemplary both in type, number, and position, and that the number of areas may be increased or decreased, placed in other places, or used for other purposes without departing from the spirit or scope of the subject matter described herein. An area may be defined by a user by selecting the edge of an application or control (e.g., with a mouse) and stretching it in a desired direction. An area may also be dragged to another location as is known by those skilled in the art.

User work area 210 is a user defined work area where a user has determined that she wants to interact with one or more applications including word processing applications, graphics applications, spreadsheet application, database applications, and the like. User entertainment area 220 is a user defined area where a user has determined that she wants to interact with applications that display content. Miscellaneous area 230 is a user defined area where a user has determined that she wants to interact with applications, such as, additional work applications, additional entertainment applications, other applications, no applications, and the like.

In operation, a user sets the boundaries of each of the areas (e.g., user work area 210, user entertainment area 220, and miscellaneous area 230) and each application functions within and based on the user determined boundaries.

Figure 3:
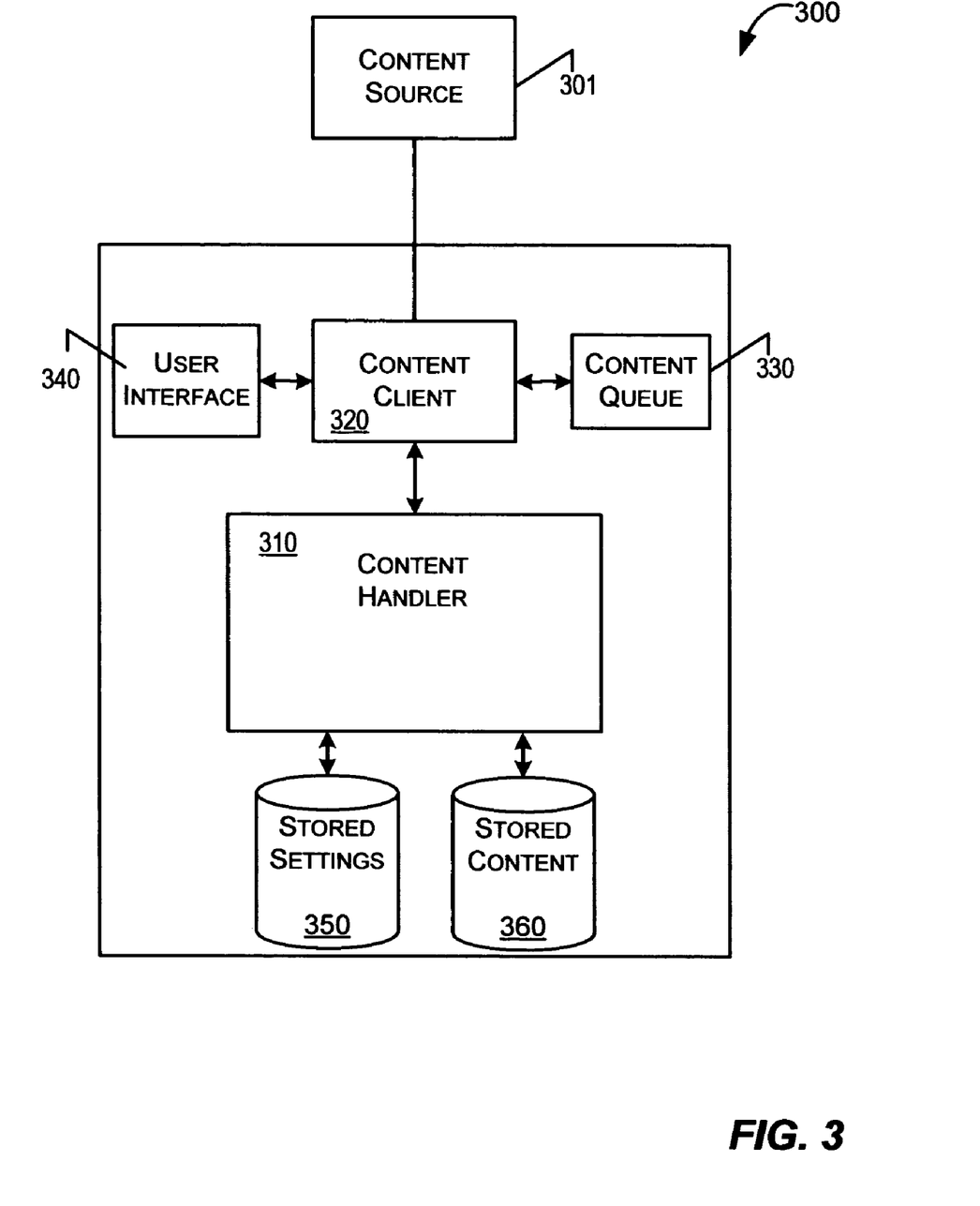
FIG. 3 is a block diagram generally illustrating an application execution environment in accordance with aspects of the subject matter described herein.

FIG. 3 is a block diagram generally illustrating an application execution environment in accordance with aspects of the subject matter described herein. Application execution environment 300 is a software system for receiving content and user preferences, and providing arranged and formatted content to a graphical user interface (GUI) that conform to the user provided preferences. In one embodiment, application execution environment 300 is a software system for receiving news content from a content source and user preferences from a GUI, and providing arranged and formatted news content to the GUI that conform to the user provided preferences. In this embodiment, application execution environment 300 is associated with a specific portion of on-screen real estate of a GUI. For example, the application executing environment 300 may display in a user-defined window or may display in area provided to a control. In an example and referring to FIG. 2 above, application execution environment 300 is a software system for receiving news content from a content source and user preferences from GUI 200, and providing arranged and formatted news content to entertainment area 220 that conforms to the user provided preferences. In another example, the arranged and formatted news content additionally includes arranged and formatted advertising content.

Application execution environment 300, as shown, includes content source 301 that is a software component (e.g., web server, media server, news server, and the like) for providing documents, including content, within application execution environment 300. Content source 301 is arranged to communicate with various software components operating within application execution environment 300, such as content client 320. Content client 320 is a mediation component that receives content (e.g., documents) from content source 301 and stores the received content for processing based on a content type. Content client 320 determines a content type for each received content document based on information contained within the document, such as whether the received content is a specific type of content needing a specific type of formatting.

In one embodiment, when content client 320 determines a content type for a received document is a type suitable for applying an adaptive multi-column layout, the received document and its content is stored (see content queue 330 detailed below) for use within application execution environment 300. In another embodiment, when content client 320 determines a content type for a received document is a type not suitable for applying an adaptive multi-column layout, the received document and its content is stored elsewhere (e.g., not within content queue 330). In yet another embodiment, when an enforced contract (e.g., such as an exclusive content agreement between content handler 310 and content source 301) is in effect, content client 320 will either store the content (see content queue 330 detailed below) for use within application execution environment 300 or pass the content to content handler 310 (detailed below) for use within application execution environment 300. Content client 320 also receives messages (e.g., content update requests) to provide to components outside of application execution environment 300 from one or more components within application execution environment 300 and processes the received messages for communicating to the outside components.

Application execution environment 300 also includes a content queue 330. Content queue 330 is a data structure for temporary storage of each received document and its content. In one embodiment, content client 320 stores documents received from content source 301 at content queue 330. Application execution environment 300 additionally includes a user interface (U/I) 340. U/I 340 is a software component for formatting and presenting data to a user as well as receiving commands (e.g., a format content commands) from the user. In one embodiment, (U/I) 340 receives input from the user (e.g., instructions for formatting content) and formats and presents content, from portions of a document, to a user. In an example and referring to FIGS. 2 and 3, U/I 340 receives input from the user (e.g., instructions for formatting content) via GUI 200 of FIG. 2 and formats and presents content (e.g., photos, titles, bylines, abstracts, etc.), from portions of a document (described in FIGS. 4-7, below), to a user via user entertainment area 220 of FIG. 2.

Application execution environment 300 further includes a stored settings database 350. Stored settings database 350 is a structured set of persistent data, such as user preferences (e.g., the size of a content window within the GUI, the type of content to send to the GUI, and the like), that allow components within application execution environment 300 to determine which received content to present to a user and the format in which to present the content. Application execution environment 300 also includes a stored content database 360. Stored content database 360 is a structured set of persistent content, such as content received from content source 301 and awaiting arranging, formatting, and presentation to a user via U/I 340.

Content handler 310 is a content engine for evaluating received documents for content, evaluating received user preferences and, when necessary, generating instructions and content packages to provided desired arranged and formatted content to a GUI via U/I 340. Content handler 310 is arranged to communicate with content client 320 as well as stored settings database 350. In one embodiment, content handler 310 receives documents including content from content client 320 and user settings from settings database 350. Content handler 310 determines whether to present the content of the document to a user based on the content of the document and the user settings received from stored settings database 350. For example, if the content of a document relates to sports and a user has specified that she wishes to receive sport-related content, the content handler 310 may include the document in its presentation to the user. In another embodiment, once content handler 310 determines to present the content of the document to a user, content handler 310 interacts with the content to determine which portions of the content and how much of each portion of the content is presented to the GUI via U/I 340. If content handler 310 determines that the user settings received from settings database 360 allow the content of the received document to be provided to a user, then instructions for arranging and formatting the content based on the content received and the user settings are produced and the content and the instructions for the arranging and formatting of the content are passed to U/I 340 and the content is formatted for presentation to a user via a GUI (not shown).

In one embodiment, content not sent to the GUI due to the arranging and formatting instructions is stored in stored content database 360 for later use. In another embodiment, because the content is dynamic and, therefore, constantly updated from content source 301, content handler 310 periodically updates the arrangement and formatting of the content that U/I 340 is providing to the GUI (not shown).

Figure 4:
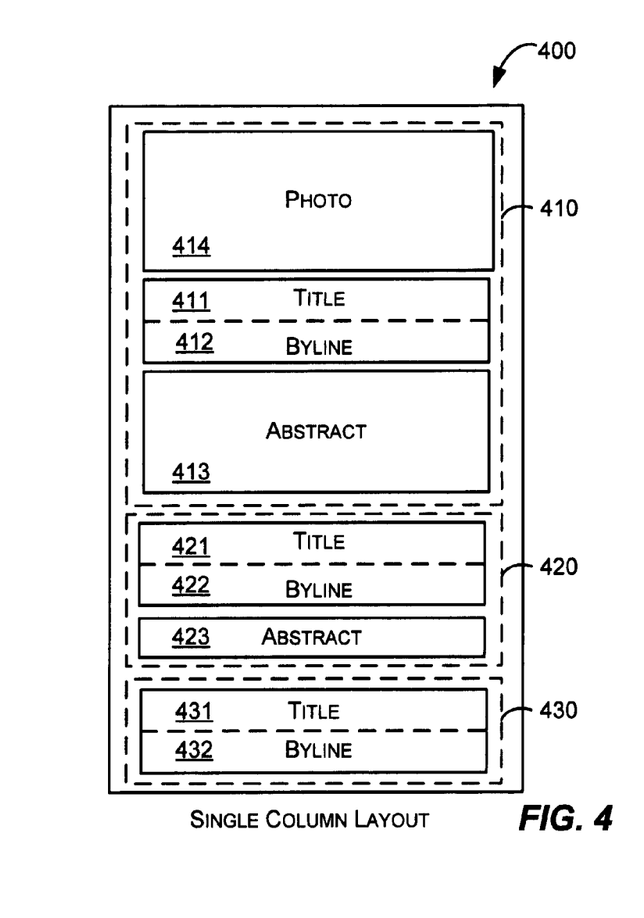
FIGS. 4-7 are block diagrams generally representing exemplary panels generated in accordance with aspects of the subject matter described herein.

FIGS. 4-7 are block diagrams generally representing exemplary panels generated in accordance with aspects of the subject matter described herein. FIG. 4 is a block diagram generally representing an exemplary column generated utilizing an adaptive single-column layout methodology. The single-column layout illustrated in FIG. 4 is utilized in conjunction with multi-column layouts to produce additional multi-column layouts. Additionally, aspects of the single-column layout illustrated in FIG. 4 may be used in similar aspects of multi-column layouts and therefore the single-column layout will be described in detail.

In FIG. 4, the single-column layout 400 includes three panels 410, 420, and 430. A panel is a software component that identifies locations on a portion of a GUI and positions objects at those locations. Each panel in single-column layout 400 is a self-contained content unit that includes a plurality of data objects for which content may be displayed to a user via a GUI. The location of each panel within the column layout is based on a set of priorities, for example, user provided priorities (e.g., user interest), provider provided priorities (e.g., story content, heuristics, advertisement frequency or ratio of stories/advertisement, etc.), and the like. In one embodiment, the content unit with the highest priority includes a flag that indicates that one or more objects (e.g., the photo) associated with the content unit should be displayed. The number of data objects displayed within each panel is dependent on the size and location of each panel in the column layout, which is based on the available screen real-estate. To that end, the objects within the content unit are prioritized with an object priority rating. The rating indicates the priority of displaying the object within the panel. As space in the panel permits, objects are displayed according to their priority. If not enough space is available in the panel, objects with lower priority are not displayed.

Some objects (e.g., title object and byline object) may be indicated as being essential to be displayed. If there is not enough space in a panel to display these objects, the panel may be withdrawn. This may be done to ensure that at least a portion of the content unit is displayed.

Panel 410, as shown, includes four objects which include title object 411, byline object 412, abstract object 413, and photo object 414. Each object includes data and information describing a function the object is fulfilling associated with the content unit as well as the aforementioned object priority rating. In one embodiment, the title object includes data and information describing the title of the panel to which the title object is associated. In another embodiment, the byline object includes data and information describing the byline (e.g., a story author) of the panel to which the byline object is associated. In yet another embodiment, the abstract object includes data and information describing the abstract of the panel to which the abstract object is associated. In one example, an abstract is a summary of a story associated with panel 410. In another example, an abstract incorporates a few sentences or a paragraph of a story associated with panel 410. In another embodiment, the photo object includes data and information to render a photo within the photo portion of the panel to which the photo object is associated. The data and information can be adjusted to meet the available space requirement of the photo object portion of the panel. In an example, the data to render photo object 414 within panel 410 is cropped or enlarged so that photo object 414 fits within the space confines allotted within panel 410.

In another embodiment, the objects associated with the panel are related to advertising and the associated advertising objects perform similar functions to the non-advertising objects. In an example, photo object 414 includes data and information to render a photo associated with the advertised product. Continuing this example, title object 411 includes data and information associated with the manufacturer or retailer of the product, and byline object 412 includes data and information associated with the trademark of the manufacturer or retailer of the product. In this example, abstract object 413 includes data and information pertaining to the remainder of the add copy associated with the product. By associating the objects with advertising data as described above, the same mechanism used for displaying non-advertising data may also be used to display advertising data.

Panel 420, as shown, includes a three objects including title object 421, byline object 422, and abstract object 423. The objects associated with panel 420 perform substantially similarly to like named objects associated with panel 410. Panel 420 may have a photo object (not shown) associated with it, but the photo object may not be rendered due to space limitations. Additionally, the abstract object, as shown, may be truncated due to space limitations.

Panel 430, as shown, includes a two objects including title object 431 and byline object 432. The objects associated with panel 430 perform substantially similarly to like named objects associated with panel 410. Panel 430 may have a photo object (not shown) and an abstract object (not shown) associated with it, but the photo and abstract objects may not be rendered due to space limitations.

In operation, single-column layout 400 is a dynamic template representing available on-screen real-estate of the GUI. Therefore, as the amount of on-screen real-estate of the GUI changes, the area allocated to each panel may change (described in FIG. 8, below) and the space available for each object may change thereby allowing more (or less) of the object's data and information to be displayed in the panel. In an example and referring to FIG. 4, if the area of single-column layout 400 were to increase vertically, abstract object 423 of panel 420 may be given more area with the result of displaying of more data and information related to the abstract object 423. Alternatively, if the area of single-column layout 400 were to increase vertically, panel 430 may be given more area with the result of displaying an abstract associated with panel 430. Additionally, during the arranging and formatting of single-column layout 400, if it is determined that there is insufficient space available to display a title object and a byline object associated with a panel, then the panel may be withdrawn from consideration for a position in the column layout. For example, if there is not enough space at the bottom of column layout 400 to display title 431 and byline 432, then the panel 430 may be withdrawn from displaying in the single-column layout 400.

Figure 5:
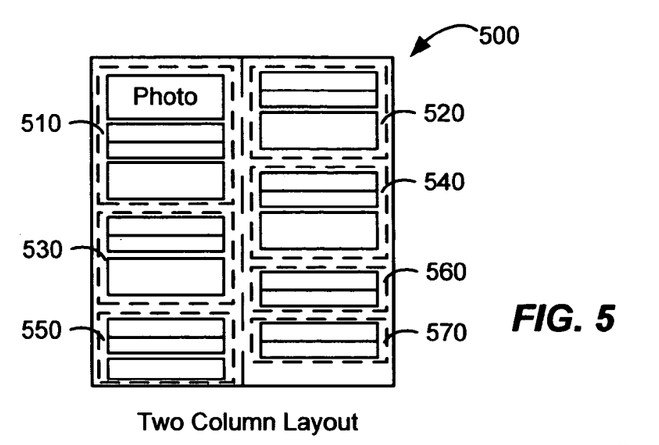

In FIG. 5, two-column layout 500 is a double-column layout that includes seven panels 510, 520, 530, 540, 550, 560, and 570. As in FIG. 4 above, each panel is a self-contained content unit that includes a plurality of data objects for displaying to a user via a GUI. The location of each panel within the column layout is based on a set of priorities, for example, user provided priorities (e.g., user interest), provider provided priorities (e.g., story content), program priorities (e.g., heuristics such as aesthetic placement of images and text), and the like. The number of data objects displayed within each panel is dependent on the size and location of each panel in the column layout, which is based on the available screen real-estate of the GUI.

In one embodiment, the content package with the highest priority is assigned to panel 510 allowing more content of the content package to be displayed within double-column layout 500 and the associated GUI that double-column layout 500 is displayed within. The content with the second highest priority is assigned to panel 520. In this way, the assignment of content to panels is accomplished numerically by stepping through the panels in priority order and assigning the next highest priority content package to the next panel. This may cause the panels associated with higher propriety content to be displayed closer to the top of the two column layout.

The location of the panels is determined heuristically by the program and is not limited to the panel illustrations of FIG. 5. In another example (not shown), the left-side panels 510, 530, and 550 may be located along the right-side of two-column layout 500 and the right-side panels 520, 540, and 560 may be located along the left-side of two-column layout 500.

Figure 6:
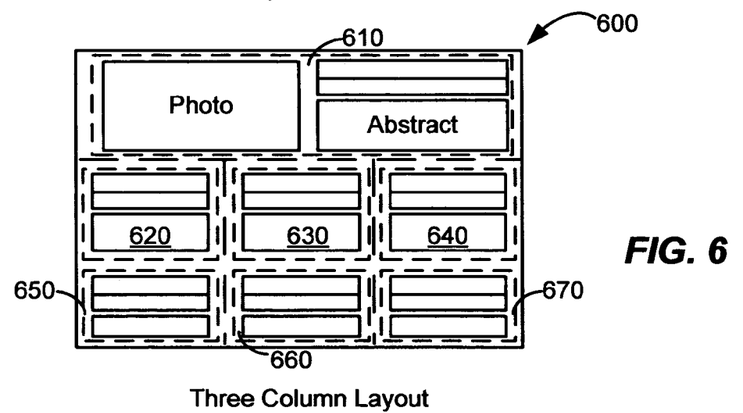

In FIG. 6, three-column layout 600 is a two-tiered column layout that includes seven panels 610, 620, 630, 640, 650, 660, and 670. As in FIGS. 4 and 5 above, each panel is a self-contained content unit that includes a plurality of data objects for displaying to a user via a GUI. The location of each panel within the column layout is based on a set of priorities, for example, user provided priorities (e.g., user interest), provider provided priorities (e.g., story content), program priorities (e.g., heuristics), and the like. The number of data objects displayed within each panel is dependent on the size and location of each panel in the column layout, which is based on the available screen real-estate of the GUI.

In one embodiment, the content package with the highest priority is assigned to panel 610, which is located within the upper-tier of the two-tiered three-column layout 600 allowing more content of the content package to be displayed within three-column layout 600 and the associated GUI that three-column layout 600 is displayed within. The content with the second highest priority is assigned to the lower tier in a position the program heuristically determines has the highest visibility or better aesthetic effect and in FIG. 6 is panel 620. In this way, the assignment of content to panels is accomplished by stepping through the panels in priority order and assigning the next highest priority content package to the next panel.

The location of the panels is determined heuristically by the program and is not limited to the panel illustrations of FIG. 6. In another example (not shown), the locations of the lower-tier panels 620-670 within the lower tier may be reconfigured based on the heuristics of the program configuring the panels.

Figure 7:
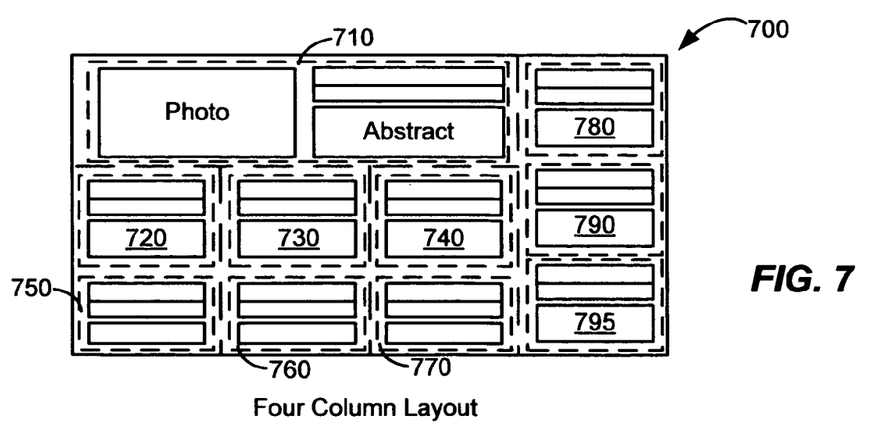

In FIG. 7, the four-column layout 700 is a multi-tiered column layout that includes ten panels 710-795. As in FIGS. 4-6 above, each panel is a self-contained content unit that includes a plurality of data objects for displaying to a user via a GUI. The location of each panel within the column layout is based on a set of priorities, for example, user provided priorities (e.g., user interest), provider provided priorities (e.g., story content), program priorities (e.g., heuristics), and the like. The number of data objects displayed within each panel is dependent on the size and location of each panel in the column layout, which is based on the available screen real-estate of the GUI.

In one embodiment, the content package with the highest priority, is assigned to panel 710, which is located within the upper-tier of the multi-tiered four-column layout allowing more content of the content package to be displayed within four-column layout 700 and the associated GUI that four-column layout 700 is displayed within. The content with the second highest priority is assigned to a position the program heuristically determines has the next highest visibility and in FIG. 7 is panel 720. In this way, the assignment of content to panels is accomplished numerically by stepping through the panels in numerical order and assigning the next highest priority content package to the next panel.

The location of the panels is determined heuristically by the program and is not limited to the panel illustrations of FIG. 7. In another example (not shown), the locations of the panels 720-795 may be reconfigured based on the heuristics of the program configuring the panels. In one embodiment, the layout of four-column layout 700 utilizes the three-column layout 600 of FIG. 6 and a modified single-column layout similar, but excluding the photo, of the single-column layout 400 of FIG. 4.

Figure 8:
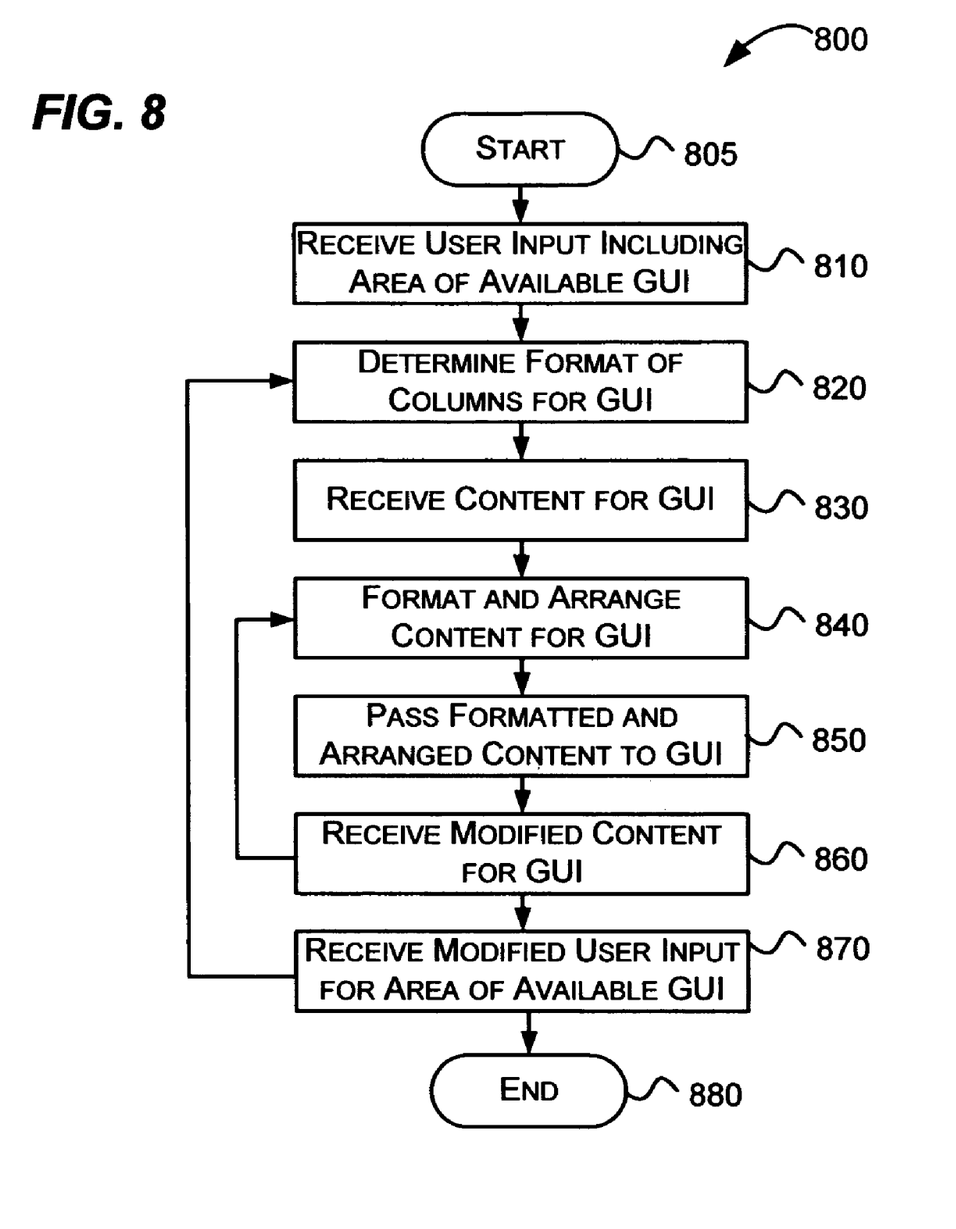
FIG. 8 is a flow diagram that generally represents actions that may occur to generate a multi-column layout in accordance with aspects of the subject matter described herein.

FIG. 8 is a flow diagram that generally represents actions that may occur to generate a multi-column layout in accordance with aspects of the subject matter described herein. In one embodiment, method 800 is implemented with components, data, and/or the exemplary operating environments of FIGS. 1-7. One or more steps of method 800 may be embodied in a computer readable medium containing computer readable code such that a series of steps are performed when the computer readable code is executed on a computing device. In some implementations, certain steps of method 800 are combined, performed simultaneously or in a different order, without deviating from the objective of method 800.

The method begins at block 805. At block 810, it is determined that user input has been received that indicates a specific area of a graphical user interface (GUI) is available. In one embodiment, the input is received from a GUI to an application execution environment that is performing the adaptive multi-column layout methodology. In an example and referring to FIGS. 2 and 3 above, the input is received from GUI 200 indicating the area of user entertainment area 220 available for content. In this example, the input is received at content handler 310 via user interface (U/I) 340.

At block 820, the format of the columns for the GUI is determined. In one embodiment, the received specific available area of the GUI is utilized to determine the number of columns that will be used. In an example, determining the number of columns that will fit into the available area includes calculating various boundaries in addition to the actual area allocated to a column, such as, the distance between columns, the borders around the columns At block 830, content for display within the GUI is received. The content can be new or previously used, but modified content. In one embodiment, new content is received for display within the GUI. In another embodiment, modified content is received for display within the GUI. In an example and referring to FIGS. 2 and 3 above, content is received from content source 301 at content client 320 for display within GUI 200. In this example, content client 320 verifies that the received content is to be displayed within GUI 200, sends the received content to content queue 330, and notifies content handler 310 of the availability of the received content.

At block 840, the received content is arranged and formatted for the GUI. In one embodiment, the received content is arranged by the content handler and passed to a user interface (U/I) for formatting and presentation to the GUI. In another embodiment, the steps of arranging the content are described in FIG. 9, below. In an example and referring to FIGS. 2 and 3 above, the received content is arranged by content handler 310 and passed to a U/I 340 for formatting and presentation to GUI 200.

At block 850, the formatted and arranged content is passed to the GUI for presentation to the user. In one embodiment, the content is passed from the application execution environment implementing the arrangement and formatting of the content to the GUI. In an example and referring to FIGS. 2 and 3 above, the content is passed from application execution environment 300 implementing the arrangement and formatting of the content (e.g., via content handler 310 and U/I 340) to GUI 200.

At block 860, modified content is received for presentation within the GUI. Modified content is either modified existing content, new content, or a combination of modified existing content and the new content. When modified content is received for presentation within the GUI, the existing content is modified with the modified content. In one embodiment, when modified content is received at application execution environment for presentation within a GUI, the modified content is added to the existing content and then the method proceeds to block 840 where the newly modified content is arranged and formatted for presentation within the GUI. In an example and referring to FIGS. 2 and 3 above, when modified content is received at content handler 310 of application execution environment 300 for presentation within GUI 200, the modified content is added to the existing content, for example by content handler 310, and then method 800 proceeds to block 840 where the newly modified content is arranged and formatted for presentation within GUI 200. In another example, the modified content arrives as a complete unit of content at content handler 310 of application execution environment 300 for presentation within GUI 200, and method 800 proceeds to block 840 where the newly arrived content is arranged and formatted for presentation within GUI 200.

At block 870, modified user input for the available area of the GUI is received. Modification of the available area of the GUI that exceed a threshold may cause the application execution environment to reconfigure the arrangement of the columns and the panels within the columns as well as the content within the panels. In one embodiment, when a modification regarding the available area of a GUI is received and the modification exceeds a threshold, then the method proceeds to block 820 where the format of the columns for the GUI is again determined. In an example and referring to FIGS. 2 and 3 above, when a modification regarding the available area of GUI 200 is received at U/I 340 of application execution environment 300 and the modification exceeds a threshold as determined by content engine 310, then method 800 proceeds to block 820 where the format of the columns for the GUI is again determined by content engine 310. The threshold may be that the content no longer fits within the available area or the available area exceeds the area currently used by the content, for example.

At block 880, method 800 ends.

Figure 9:
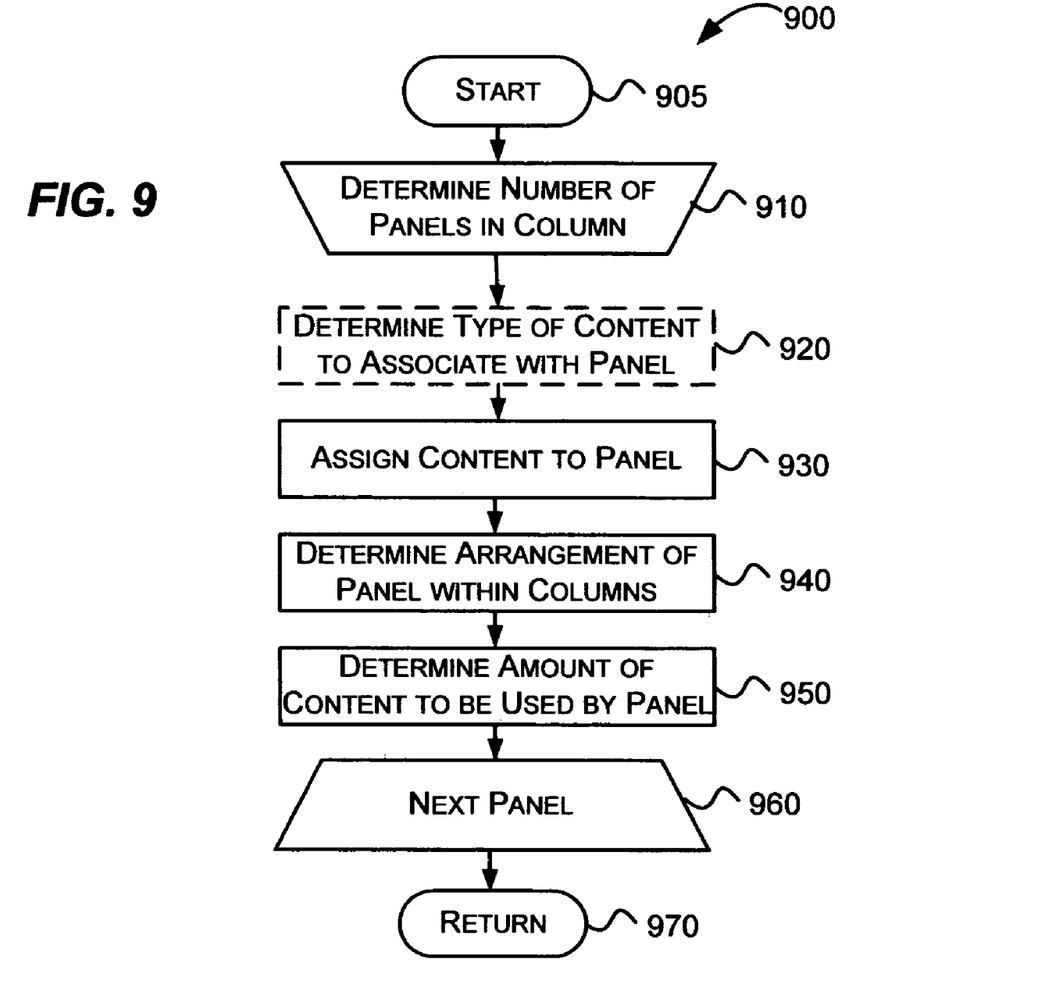
FIG. 9 is a flow diagram that generally represents actions corresponding to block 840 of FIG. 8 that may occur to format and arrange content in accordance with aspects of the subject matter described herein.

FIG. 9 is a flow diagram that generally represents actions corresponding to block 840 of FIG. 8 that may occur to format and arrange content in accordance with aspects of the subject matter described herein. More specifically, FIG. 9 is a flow diagram generally illustrating a method 900 for arranging and formatting content for use within a graphical user interface (GUI) as described in FIG. 8, above. In one embodiment and as in an embodiment of method 800 above, method 900 is implemented with components, data, and/or the exemplary operating environments of FIGS. 1-7. One or more steps of method 900 may be embodied in a computer readable medium containing computer readable code such that a series of steps are performed when the computer readable code is executed on a computing device. In some implementations, certain steps of method 900 are combined, performed simultaneously or in a different order, without deviating from the objective of method 900.

The method begins at block 905. At block 910, the number of panels within the layout is determined. In one embodiment, the number of panels is determined heuristically and is based on the number of columns within the layout and the height of the layout. In an example and referring to FIG. 5 above, two-column layout 500 is a double-column layout that includes seven panels 510, 520, 530, 540, 550, 560, and 570. In this example, if the width of two-column layout 500 decreases, then the number of columns may correspondingly decrease as well. Alternatively, if the width of two-column layout 500 increases, then the number of columns may correspondingly increase. In one embodiment, if there is not enough area for a panel to provided a minimum amount of content (e.g., data from a title object and a byline object), then the panel is withdrawn from the layout.

At optional block 920, the type of content that is to be associated with each panel is determined. In one embodiment, based on a ratio of news story panels to advertisement panels, the number of news story panels and the number of advertisement panels is determined.

At block 930, content is assigned to a panel. In one embodiment, content is assigned to a panel based on a priority assigned to each item of content. In this embodiment, content with the higher priority is assigned to a panel that will have a more prominent location within the column layout. In another embodiment, in addition to story content, advertising content is assigned to a panel based on a priority assigned to each advertising item of content and the determination of the ratio of stories to advertisements is made in optional block 920. In another embodiment, certain priority levels assigned to the content (e.g., flags assigned to the content by the content provider) indicate that the content will attempt to push, or not push, certain objects onto the panel to which the content is assigned. In an example, included within a priority level is a mode factor that further defines what the content will attempt to push, or not push, onto the panel. Examples of mode factors include a no photo mode, a no photo and no abstract mode, and the like.

At block 940, the arrangement of a panel within the column layout is determined. Based on the location of a panel within the column layout, the area of the panel is determined. In one embodiment, the panels are arranged heuristically within the column layout based on the priority of the assigned content. In an example and referring to FIG. 6 above, the content with the highest priority is assigned to panel 610 of three-column layout 600. In this example, the content with the second highest priority is assigned to panel 620 of three-column layout 600.

At block 950, the amount of content to be used by a panel is determined. In one embodiment, the content handler requests the amount of area available from the panel and determines which objects it will push onto the panel based on the area available. The objects are prioritized (e.g., title object and byline object, abstract object, photo object, etc.) and pushed onto the panel based on the area available and, if available, a mode factor as described in block 930 above. In another embodiment, certain objects (e.g., abstract object, photo object, etc.) are truncated/cropped or increased depending on the available area. In this embodiment, if the area available is not sufficient to include a minimal number of objects (e.g., title object and byline object), then the content and the associated panel are withdrawn from the column layout.

At block 960, the method advances to block 910 where the next panel is associated with content. When the last panel has been associated with content, method 900 advances to block 970.

At block 970, method 900 returns to block 840 of FIG. 8.

As can be seen from the foregoing detailed description, aspects have been described related to adaptively laying out content. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method performed by a processor of a computing system for dynamically displaying content corresponding to news information on a display device of the computing system, the method comprising:

receiving, by the processor, notification that an area within a graphical user interface is available, the notification including dimensions of the area, the graphical user interface being displayed on a display device of the computing system;

determining, by the processor, a column configuration layout based on the dimensions of the area, the column configuration layout including a number of columns, a number of panels associated with each column, positioning of the columns within the area, and positioning of the panels within the associated columns;

receiving, by the processor, at least one content document corresponding to news information, each content document including content for display within the area and a content priority rating, the content including a plurality of objects, each object including data for display and an object priority rating, wherein the plurality of objects includes a title object, a byline object, an abstract object, a photo object, and a story object;

associating, by the processor, each content document with a panel based on the content priority rating;

determining that the area of the associated panel is sufficient to display each of the plurality of objects;

arranging, by the processor, the content of each content document within the area of the associated panel based on the object priority ratings such that each of the plurality of objects is displayed;

after arranging the content, determining, by the processor, that the area of the associated panel has been reduced and in response, removing the abstract object, the photo object, and the story object from the associated panel such that only the title object and byline object are displayed within the associated panel; and after removing the abstract object, the photo object, and the story object, determining, by the processor, that the area of the associated panel has been further reduced and in response, removing the associated panel from its associated column upon determining that the area of the panel is insufficient to display the title and byline objects of the content document associated with the panel.

2. A computer storage medium having computer-executable instructions which when executed by a processor of a computing system perform steps, comprising:

receiving, by the processor, notification that an area within a graphical user interface is available, the notification including dimensions of the area, the graphical user interface being displayed on a display device of the computing system;

determining, by the processor, a column configuration layout based on the dimensions of the area, the column configuration layout including a number of columns, a number of panels associated with each column, positioning of the columns within the area, and positioning of the panels within the associated columns;

receiving, by the processor, at least one content document, each content document including content for display within the area and a content priority rating, the content including a plurality of objects, each object including data for display and an object priority rating, wherein each of the plurality of objects is selected from the group consisting of: a title, a byline, an abstract, a photo, and a story;

associating, by the processor, each content document with a panel based on the content priority rating;

arranging, by the processor, the content of each content document within the area of the associated panel based on the object priority ratings, wherein the plurality of objects included in the content of each content document is arranged within the associated panel based on the area allocated to the associated panel such that when the area allocated to the associated panel is below a threshold, only the title and byline objects are displayed within the associated panel and such that when the area allocated to the associated panel increases above the threshold, one or more of the abstract, photo, or story objects are also displayed within the associated panel; and removing a panel from its associated column upon determining that the area of the panel is insufficient to display the title and byline objects of the content document associated with the panel.

3. The computer storage medium of claim 2, further comprising passing the column configuration layout to the graphical user interface.

4. The computer storage medium of claim 2, wherein the dimensions of the area within the graphical user interface is defined by a width and a height, and wherein the number of columns of the column configuration layout is based on the width of the area.

5. The computer storage medium of claim 2, wherein the content within the content document is selected from the group consisting of: story information, news information, and advertisement information.

6. The computer storage medium of claim 2, wherein each column is defined by a width and a height, and the number of panels associated with each column is based on the height of the associated column.

7. The computer storage medium of claim 2, wherein the column configuration layout further includes a column type associated with each column based on the total number of columns, and wherein a column having a high priority column type further includes dimensions that are different than a column not having a high priority column type.

8. The computer storage medium of claim 2, wherein arranging the content of each content document within the associated panel includes determining, in order of priority, which objects of the content fit within the associated panel.

9. The computer storage medium of claim 8, wherein objects capable of resizing are resized to fit within the area of the associated panel.

10. The computer storage medium of claim 2, further comprising:
   determining that the area of the associated panel is insufficient to display the title and byline objects; and
   removing the panel from the column.

11. The computer storage medium of claim 2, further comprising:
   displaying the abstract object in the associated panel in conjunction with the title and byline objects; and
   upon receiving user input which causes the area of the associated panel to be reduced, truncating the content of the abstract objet such that the abstract object fits within the reduced size of the associated panel.

12. A computer storage medium encoded with computer-readable components, the components comprising:
   a content queue configured for storing received content;
   a content client configured to receive content and determine whether the content is user desired content, the user desired content including a content priority rating and a plurality of objects, each object including data for display and an object priority rating;
   a stored settings database including user settings, the user settings defining user desired content;
   a user interface configured to receive user information and to format and present content to a user, the user information including notification that an area within a graphical user interface is available; and
   a content engine, the content engine configured to retrieve the stored content and the stored user settings, the content engine further configured to determine a column configuration layout based on the dimensions of the area, the content engine additionally configured to arrange the user desired content within the column configuration layout;
   wherein the column configuration layout includes a number of columns, a number of panels associated with each column, and positions of the columns within the area of the graphical user interface and positions of the panels within the associated columns;
   wherein the content engine is further configured to associate the user desired content with a panel based on the content priority rating and to pass the column configuration to the user interface, wherein associating the user desired content with a panel comprises:
      arranging the user desired content within the area of the associated panel based on the area allocated to the associated panel such that when the area allocated to the associated panel is below a threshold, only the title and byline objects are displayed within the associated panel and such that when the area allocated to the associated panel increases above the threshold, one or more of an abstract, photo, or story object is also displayed within the associated panel; and
   wherein the content engine is further configured to remove a panel from its associated column upon determining that the area of the panel is insufficient to display the title and byline objects of the user desired content associated with the panel.

13. The computer storage medium encoded with computer-readable components of claim 12, wherein the dimensions of the area within the graphical user interface is defined by a width and a height, and wherein the number of columns of the column configuration layout is based on the width of the area.

14. The computer storage medium encoded with computer-readable components of claim 12, wherein each column is defined by a width and a height, and the number of panels associated with each column is based on the height of the associated column.

15. The computer storage medium encoded with computer-readable components of claim 12, wherein the user desired content is selected from the group consisting of: story information, news information, and advertisement information.

* * * * *